(12) United States Patent
Chang et al.

(10) Patent No.: US 8,574,117 B2
(45) Date of Patent: Nov. 5, 2013

(54) MECHANISM WITH COMPONENT POSITION ADJUSTING FUNCTION

(75) Inventors: Shian-Wen Chang, Hsinchu (TW); Chun-Jen Weng, Chiayi County (TW); Da-Ren Liu, New Taipei (TW)

(73) Assignee: National Applied Research Laboratories, Taipei (TW)

( * ) Notice: Subject to any disclaimer, the term of this patent is extended or adjusted under 35 U.S.C. 154(b) by 152 days.

(21) Appl. No.: 13/243,345

(22) Filed: Sep. 23, 2011

(65) Prior Publication Data

US 2013/0045830 A1 Feb. 21, 2013

(30) Foreign Application Priority Data

Aug. 19, 2011 (TW) .............................. 100129879 A (51) Int. Cl.
*F16H 3/44* (2006.01)
(52) U.S. Cl.
USPC .......................................................... 475/323
(58) Field of Classification Search
USPC .......................... 475/323, 324, 326, 294, 331
See application file for complete search history.

(56) References Cited

U.S. PATENT DOCUMENTS

| 3,628,401 | A | * | 12/1971 | Wuerfel | 477/121 |
| 6,007,447 | A | * | 12/1999 | Lin | 475/149 |
| 6,537,169 | B1 | * | 3/2003 | Morii | 475/8 |
| 7,223,198 | B2 | * | 5/2007 | Kimes et al. | 475/331 |
| 2009/0233755 | A1 | * | 9/2009 | Kimes | 475/324 |
| 2010/0227732 | A1 | * | 9/2010 | Pederson | 475/284 |
| 2012/0077634 | A1 | * | 3/2012 | Thompson | 475/116 |

* cited by examiner

*Primary Examiner* — David D Le
*Assistant Examiner* — David J Hlavka
(74) *Attorney, Agent, or Firm* — Muncy, Geissler, Olds & Lowe, PLLC (57) ABSTRACT

This invention discloses a mechanism with a component position adjusting function, comprising a drive unit, a drive shaft, a plate body, a drive wheel, at least one passive component and a brake. The drive unit performs a forward or reverse rotating shift and drives the drive shaft to rotate. The unidirectional component has a through hole, and disposes at the plate body. An end of the drive shaft is passed through the through hole and exposed from the plate body. The drive shaft synchronously drives the plate body and the drive wheel to rotate forward. The passive component is arranged at the plate body and contacted with the drive shaft with synchronously drives and rotates the passive component. The plate body remains still through the rotation of the unidirectional component and the contact of the brake with the plate body.

12 Claims, 7 Drawing Sheets

MECHANISM WITH COMPONENT POSITION ADJUSTING FUNCTION

CROSS-REFERENCE TO RELATED APPLICATION

This application claims the benefit of Taiwan Patent Search No. 100129879, filed on Aug. 19, 2011, in the Taiwan Intellectual Property Office, the disclosure of which is incorporated herein in its entirety by reference.

BACKGROUND OF THE INVENTION

1. Field of the Invention

The present invention relates to a mechanism with a component position adjusting function, in particular to the mechanism capable of adjusting the positions of an optical component and a vacuum coating target material.

2. Description of the Related Art

At present, a drive unit, such as a motor, a servo or a manual rocker, is generally used for driving a set of transmission devices such as gears or pulleys in most industrial applications for power output. In the meantime, a movement, such as an elevation, or a transverse shift or rotation, can be performed by one drive unit. If it is necessary to complete two or more movements, it is necessary to install a plurality of drive units, and each drive unit drives a transmission device to operate and complete each movement. For example, a polarization device disposed in an optical mechanism includes a plurality of polarizers and waveplates arranged in a matrix on a circular wheel, and one drive unit is provided for operating the transmission device to shift one of the polarizers and waveplates to a predetermined position. If it is necessary to adjust a relative angle of a set of polarizer and wave-plate, then another drive unit and another transmission device are required. Obviously, such arrangement incurs a higher cost, and the volume of the transmission device is increased. For a manual transmission device, the increase of components and total weight cause burdens to the operation and transportation of the device and inconvenience to users.

In view of the drawbacks of the prior art, the inventor of the present invention designed a mechanism with a component position adjusting function in accordance with the present invention, in hope of overcoming the drawbacks of the prior art and improve the industrial use of the mechanism.

SUMMARY OF THE INVENTION

Therefore, it is a primary objective of the present invention to provide a mechanism with a component position adjusting function to reduce the volume and cost of the conventional mechanism.

To achieve the aforementioned objective, the present invention provides a mechanism with a component position adjusting function, comprising: a drive unit, a drive shaft, a plate body, a drive wheel, at least one passive component and a brake. Wherein, the drive unit performs a forward or reverse rotating shift. An end of the drive shaft is fixed to the drive unit, and the drive unit drives the drive shaft to rotate. The plate body has a unidirectional component disposed at the center of the plate body, and the unidirectional component has a through hole, and the other side of the drive shaft passing through the through hole is exposed from the other side of the plate body, and the unidirectional component limits the drive shaft to synchronously drive the plate body to rotate in a forward direction. The drive wheel fixed to the drive shaft is exposed from an end of the plate body, and the drive shaft synchronously drives the drive wheel to rotate. At least one passive component is disposed onto the plate body and contacted with the drive wheel, and the drive wheel synchronously drives each passive component to rotate. The brake is disposed at a position corresponding to the height of the plate body. Through the rotation of the unidirectional component and the contact of the brake with the plate body, the plate body remains still.

Wherein, the mechanism with a component position adjusting function further comprises at least one rotating component disposed at a position corresponding to the passive component.

Wherein, at passive component is disposed onto the rotating component, and the rotating component is disposed onto the plate body.

Wherein, the rotating component is a bi-directional bearing or a bi-directional ratchet.

Wherein, the unidirectional component is a limit unidirectional rotating component which is a unidirectional bearing or a unidirectional ratchet.

Wherein, the contact of the drive wheel with the passive component is between a gear set, a friction wheel set or a pulley set.

Wherein, at least one passive component has a first containing portion.

Wherein, the first containing portion is penetrated through the passive component.

Wherein, the mechanism with a component position adjusting function further comprises at least one fixing component disposed on the plate body and corresponding to the passive component and on a different side of the passive component, and each fixing component having a second containing portion.

Wherein, the second containing portion is penetrated through the fixing component.

Another objective of the present invention is to provide a mechanism with a component position adjusting function, comprising: a drive unit, a drive shaft, a plate body, at least one passive component, at least one fixing component and a brake. The drive unit performs a forward or reverse rotating shift. An end of the drive shaft is fixed to the drive unit, and the drive unit drives the drive shaft to rotate. The plate body includes a unidirectional component disposed at the center of the plate body, and the unidirectional component has a through hole, and the other end of the drive shaft is passed through the through hole and exposed from the other side of the plate body. With the limitation of the unidirectional component, the drive shaft synchronously drives the plate body to rotate in a forward direction. At least one passive component is disposed on the plate body. The drive wheel fixed to the drive shaft is exposed from an end of the plate body, and the drive shaft synchronously drives the drive wheel to rotate. At least one fixing component corresponding to the passive component is disposed onto the drive wheel. The brake is disposed at a position corresponding to the plate body. Through the rotation of the unidirectional component and the contact of the brake with the plate body, the plate body remains still.

Wherein, the unidirectional component is a limit unidirectional rotating component such as a unidirectional bearing or a unidirectional ratchet.

Wherein, each passive component has a first containing portion penetrated through the passive component.

Wherein, at least one fixing component has a second containing portion penetrated through the fixing component.

In summation of the description above, the mechanism with a component position adjusting function of the present invention has one or more of the following advantages:

(1) The mechanism with a component position adjusting function can complete shifting the position, an angular rotation, or a combination of position and rotation of a component by a drive unit, so as to reduce the volume of the mechanism and the using space effectively.

(2) The mechanism with a component position adjusting function can complete shifting the position, an angular rotation, or a combination of position and rotation of a component by a drive unit, so as to simplify the components of the mechanism and lower the manufacturing cost.

(3) The mechanism with a component position adjusting function can complete shifting the position, an angular rotation, or a combination of position and rotation of a component by a drive unit, so as to simplify the control system and provide a higher system integration precision.

DESCRIPTION OF THE PREFERRED EMBODIMENTS

The technical characteristics and effects of the present invention will become apparent by the detailed description of preferred embodiments and related drawings as follows.

The mechanism with a component position adjusting function according to the present invention can be applied in the areas of optical measurement and manufacture of components including as polarization devices, cylindrical lens, gratings, optical lenses, filter waveplates, optical attenuators or diffraction components.

Figure 1:
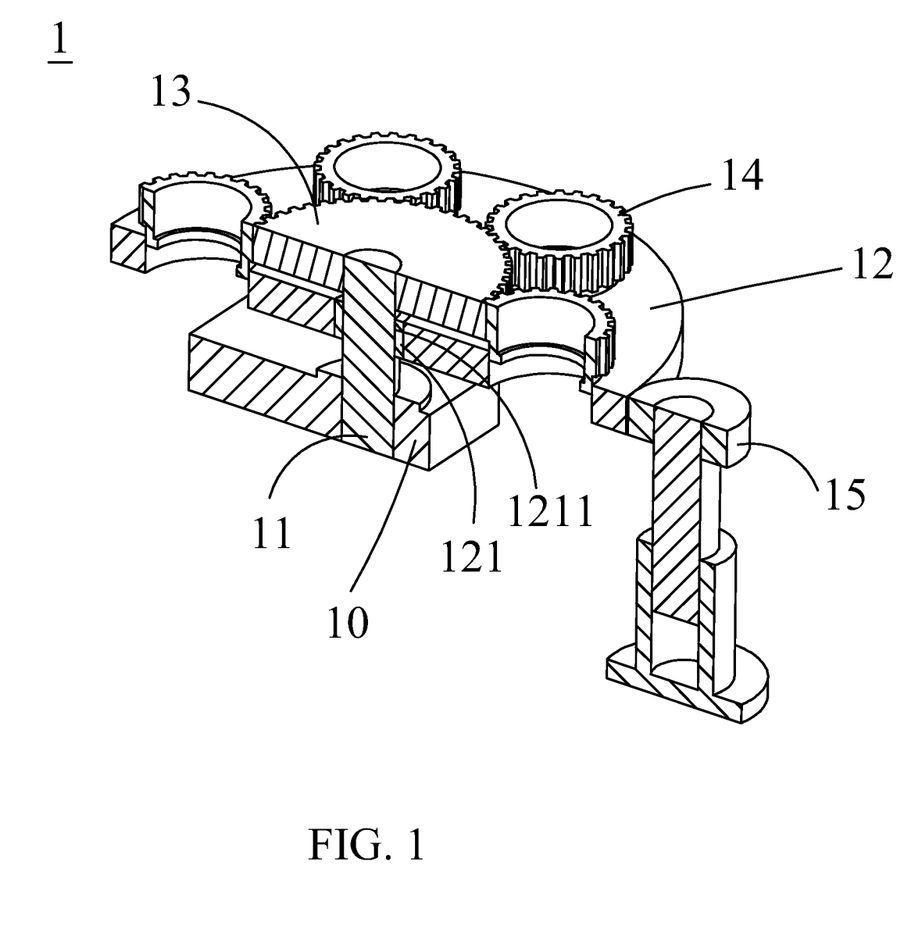
FIG. 1 is a schematic view of a mechanism with a component position adjusting function according to the present invention.

With reference to FIG. 1 for a schematic view of a mechanism with a component position adjusting function of the present invention, the mechanism with a component position adjusting function 1 comprises a drive unit 10, a drive shaft 11, a plate body 12, a drive wheel 13, at least one passive component 14 and a brake 15. The drive unit 10 is provided for driving a component to perform a forward or reverse rotating shift. An end of the drive shaft 11 is fixed to the drive unit 10, and the drive unit 10 drives the drive shaft 11 to rotate. The plate body 12 includes a unidirectional component 121 disposed at the center of the plate body 12, and the unidirectional component 121 has a through hole 1211, and the other end of the drive shaft 11 is passed through the through hole 1211 and exposed from the other side of the plate body 12. With the limitation of the unidirectional component 121, the drive shaft 11 synchronously drives the plate body 12 to rotate in a forward direction. Wherein, the unidirectional component 121 can be a unidirectional rotating component such as a unidirectional bearing or a unidirectional ratchet. For example, when the drive unit 10 drives the drive shaft 11 to perform a forward rotation, the limitation of the unidirectional component 121 allows the plate body 12 to synchronously rotate with the drive shaft 11. When the drive unit 10 drives the drive shaft 11 to rotate in a reverse direction, the plate body 12 will not rotate in a reverse direction with the drive shaft 11 through the rotation of the unidirectional component 121.

The drive wheel 13 fixed to the drive shaft 11 is exposed from an end of the plate body 12, and the drive shaft 11 synchronously drives the drive wheel 13 to rotate. At least one passive component 14 is disposed onto the plate body 12 and contacted with the drive wheel 13, and the drive wheel 13 synchronously drives each passive component 14 to rotate. Preferably, the passive component 14 is arranged in a matrix on the plate body 12, and the through hole 1211 is used as the center, so that when the plate body 12 rotates, the passive component 14 can be switched to the same position. In addition, the contact between the drive wheel 13 and the passive component 14 is a contact between a gear set, a friction wheel set or a pulley set, which can be changed according to different applications. For example, if it is necessary to rotate the passive component 14 with a precise angle, the gear set can be used for the contact. The brake 15 is disposed at a position corresponding to the height of the plate body 12. The plate body 12 can be maintained without rotating in a reverse direction through rotating the brake 15 contacting with the plate body 12. Preferably, the brake 15 includes a unidirectional bearing with a reverse limit direction and disposed at a fixing position of the brake 15, so that the brake 15 can be rotated in a reverse direction with the plate body 12.

Figure 2:
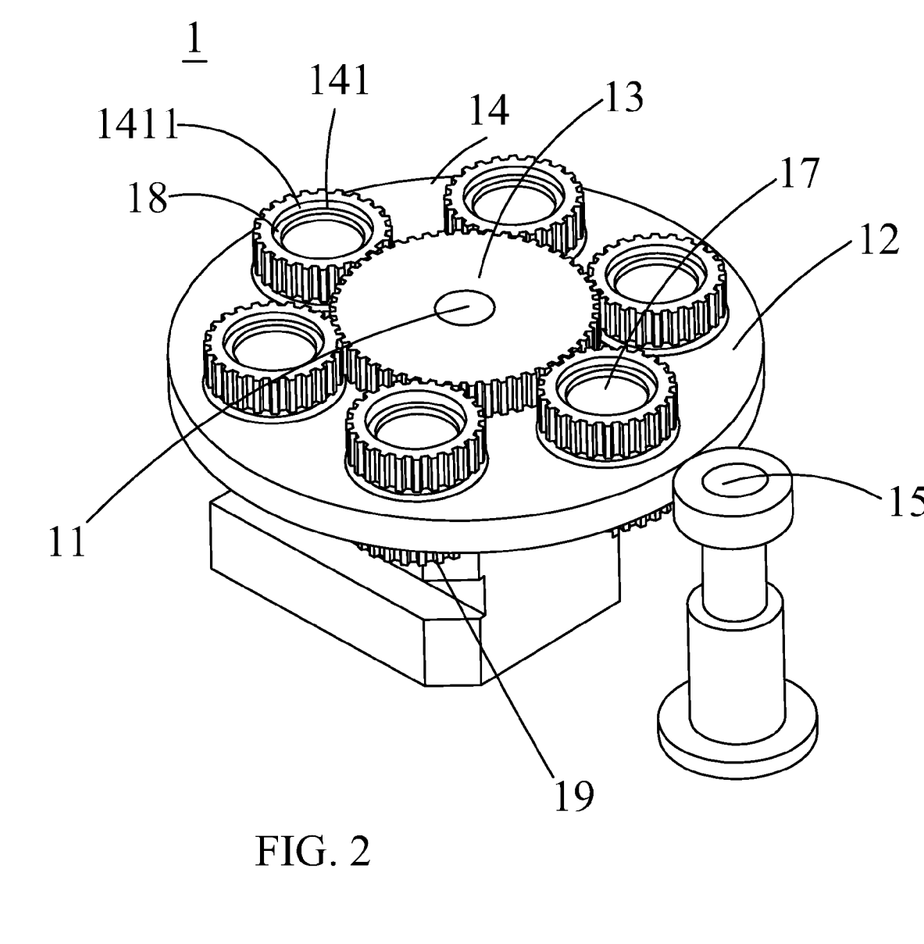
FIG. 2 is a schematic view of a mechanism with a component position adjusting function according to a first preferred embodiment of the present invention.
Figure 3:
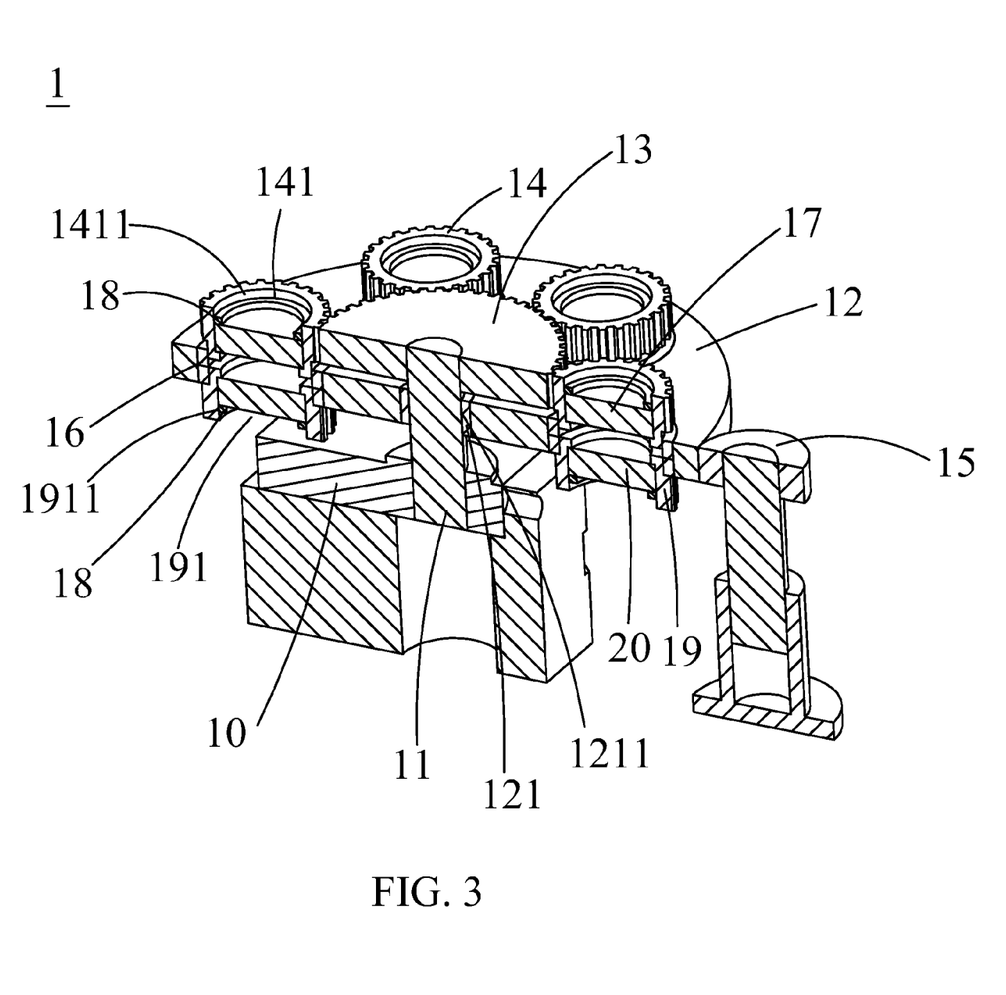
FIG. 3 is a cross-sectional view of a mechanism with a component position adjusting function according to the first preferred embodiment of the present invention.

With reference to FIGS. 2 and 3 for a schematic view and a cross-sectional view of a mechanism with a component position adjusting function in accordance with the first preferred embodiment of the present invention respectively, the mechanism with a component position adjusting function 1 comprises a drive unit 10, a drive shaft 11, a plate body 12, a drive wheel 13, at least one passive component 14 and a brake 15. Wherein, the drive unit 10 is a motor, a servo or a manual rocker for providing the power for a forward rotation or reverse rotation. In this preferred embodiment, a motor is used for illustrating the invention. This preferred embodiment is substantially the same as the description above, except that the mechanism with a component position adjusting function 1 further comprises at least one rotating component 16 disposed corresponding to the passive component 14, and each passive component 14 is disposed onto the rotating component 16, and each rotating component 16 is disposed onto the plate body 12. The rotating component 16 can be a bi-directional bearing or a bi-directional ratchet. The rotating component 16 act as a bridge for connecting the passive component 14 and the plate body 12 to reduce the friction with the plate body 12 during the rotation of the passive component 14, so as to provide a smooth rotation. Wherein, each passive component 14 has a first containing portion 141 penetrated through the passive component 14. In this preferred embodiment, the first containing portion 141 is in a hollow stairway form for accommodating a wave-plate 17. Preferably, screw threads are formed at an opening 1411 of the first containing portion 141 and secured with a threaded ring 18 to assure that the wave-plate 17 will not slide or move, and can rotate together with the passive component 14.

The mechanism with a component position adjusting function 1 further comprises at least one fixing component 19 disposed onto the plate body 12, and at least one passive component 14 disposed on both sides of the plate body 12 respectively. Each fixing component 19 has a second containing portion 191 penetrated through the fixing component 19. The second containing portion 191 can be in a hollow stairway form for accommodating a polarizer 20. Preferably, screw threads are formed at an opening 1911 of the second containing portion 191 and secured with a threaded ring 18 to assure that the polarizer 20 will not slide or move, so as to prevent the polarizer 20 from falling out during the rotation of the plate body 12.

When the drive unit 10 drives the drive shaft 11 to rotate in a forward direction, the characteristic of the unidirectional component 121 not rotated with the drive shaft 11, the drive shaft 11 synchronously drives the plate body 12 to rotate to shift the passive component 14 to a predetermined position. When the drive unit 10 drives the drive shaft 11 to rotate in a reverse direction, the rotation of the unidirectional component 121 and the limited contact with the brake 15 can assure that the plate body 12 will not rotate in a reverse direction. The drive wheel 13 is fixed to the drive shaft 11 and exposed from an end of the plate body 12, and the drive shaft 11 synchronously drives the drive wheel 13 to rotate. Through the contact of the gear set between the drive wheel 13 and the passive component 14, the drive wheel 13 synchronously drives each passive component 14 to rotate, so as to rotate wave-plate 17 at the predetermined position of the passive component 14 to a predetermined angle that is matched with the polarizer 20 disposed in the fixing component 19. A predetermined light source is passed through the wave-plate 17 and the polarizer 20 to produce a polarization of a predetermined wave band.

Figure 4:
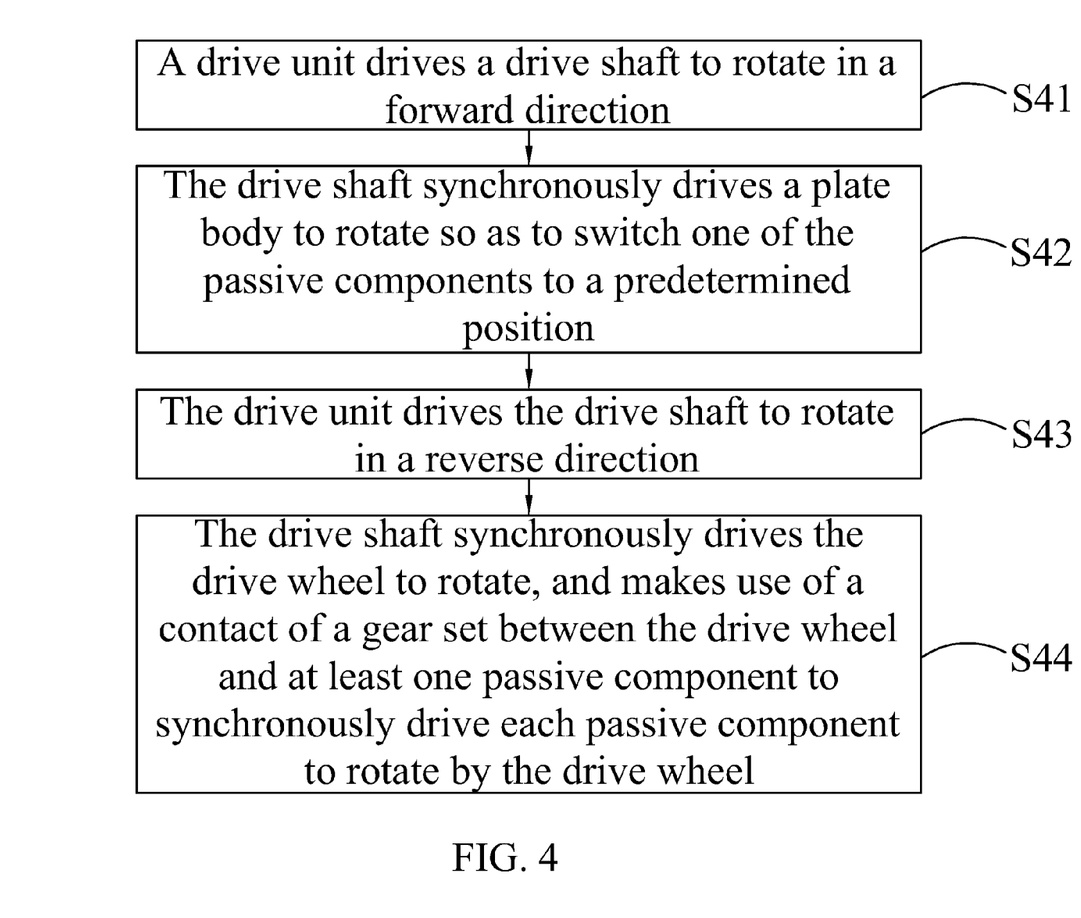
FIG. 4 is a flow chart of an operation of a mechanism with a component position adjusting function according to the first preferred embodiment of the present invention.

With reference to FIG. 4 for the flow chart of an operation of the mechanism with a component position adjusting function 1 in accordance with the present invention, the operation comprises the following steps.

(S41): The drive unit drives the drive shaft to rotate in a forward direction.

(S42): The drive shaft synchronously drives the plate body to rotate to switch one of the passive components to a predetermined position.

(S43): The drive unit drives the drive shaft to rotate in a reverse direction.

(S44): The drive shaft synchronously drives the drive wheel to rotate, and makes use of a contact of a gear set between the drive wheel and at least one passive component to synchronously drive each passive component to rotate by the drive wheel.

By rotating the wave-plate at a predetermined position of the passive component to a predetermined angle to match with the polarizer in the fixing component, a predetermined light source is passed from the wave-plate and the polarizer to produce any arbitrary polarization state of a predetermined wave band.

When the mechanism with a component position adjusting function in accordance with the first preferred embodiment of the present invention is applied in an optical mechanism, the plurality of polarizers and the plurality of waveplates can be shifted to a position or rotated by adjusting the mechanism with a component position adjusting function, such that a predetermined light source of a single light path can produce a polarization with different wave bands.

The mechanism with a component position adjusting function 1 of the present invention can be placed on a table horizontally or vertically according to the actual requirement, and the way of placing the mechanism is not limited to this preferred embodiment only.

Figure 5:
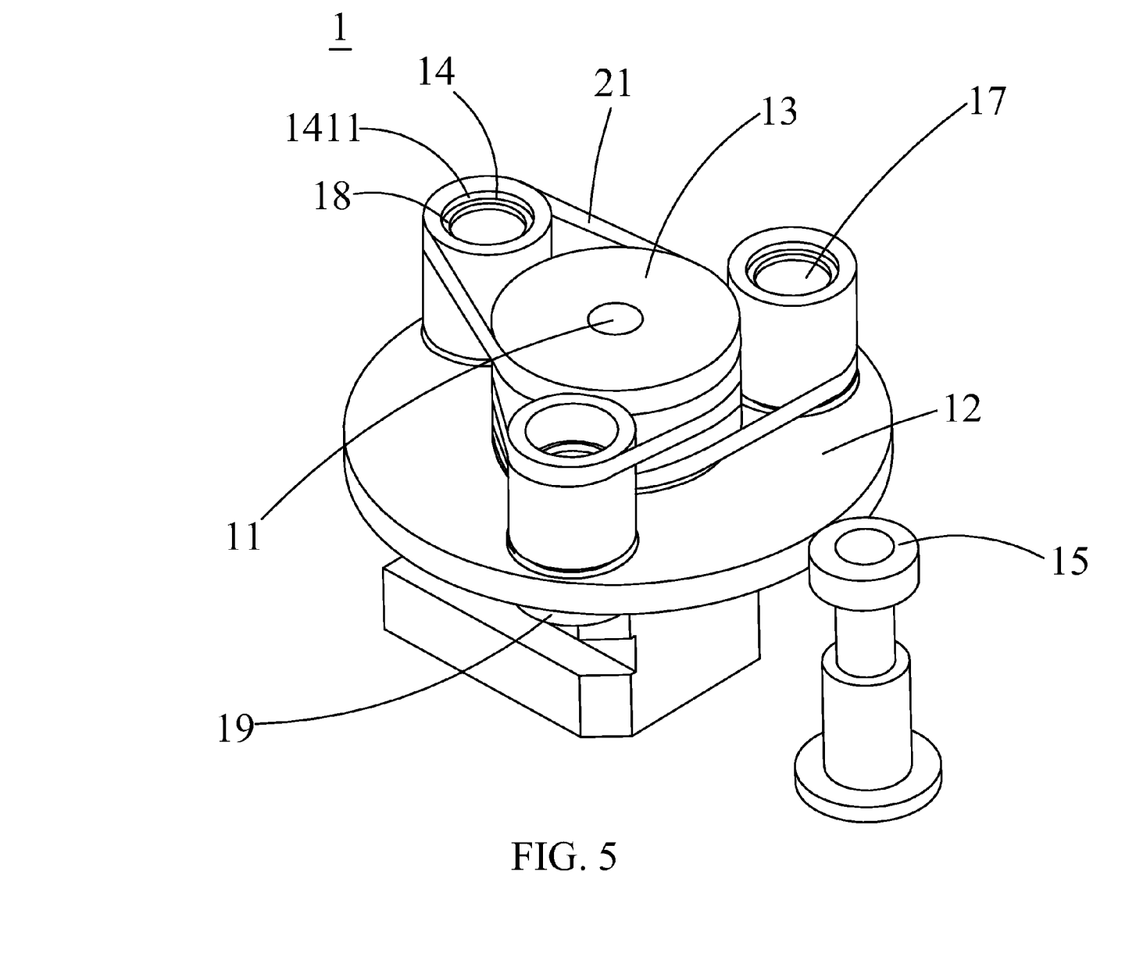
FIG. 5 is a schematic view of a mechanism with a component position adjusting function according to a second preferred embodiment of the present invention.

With reference to FIG. 5 for a schematic view of a mechanism with a component position adjusting function in accordance with a second preferred embodiment of the present invention, the mechanism with a component position adjusting function 1 comprises a drive unit 10, a drive shaft 11, a plate body 12, a drive wheel 13, at least one passive component 14 and a brake 15. This preferred embodiment is substantially the same as the first preferred embodiment, except that the contact between the drive wheel 13 and the passive component 14 may be a contact between a pulley set.

In this preferred embodiment, belts are mounted onto the drive wheel 13 and each passive component 14, such that the drive wheel 13 can drive the passive components 14 to rotate through the belts.

Figure 6:
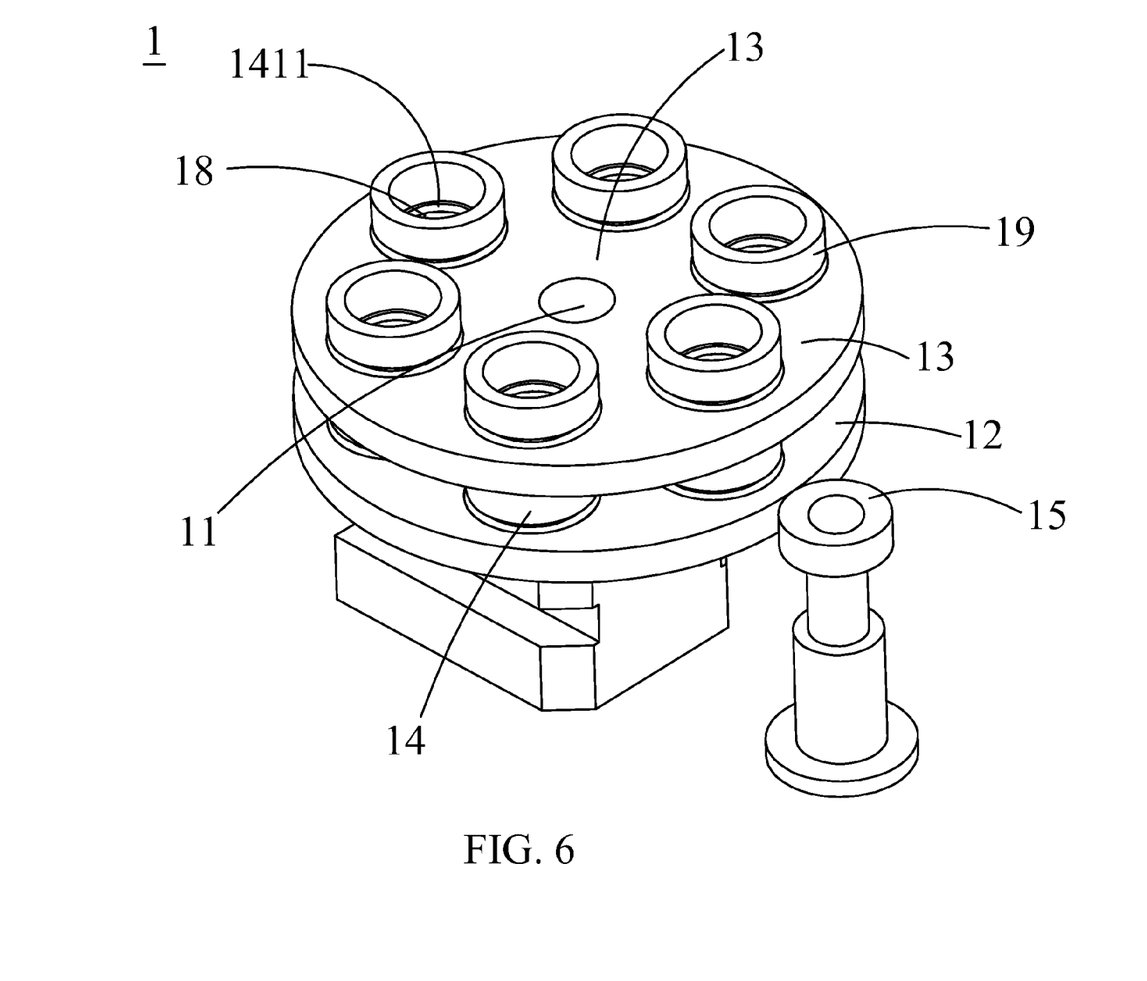
FIG. 6 is a schematic view of another state of a mechanism with a component position adjusting function of the present invention.
Figure 7:
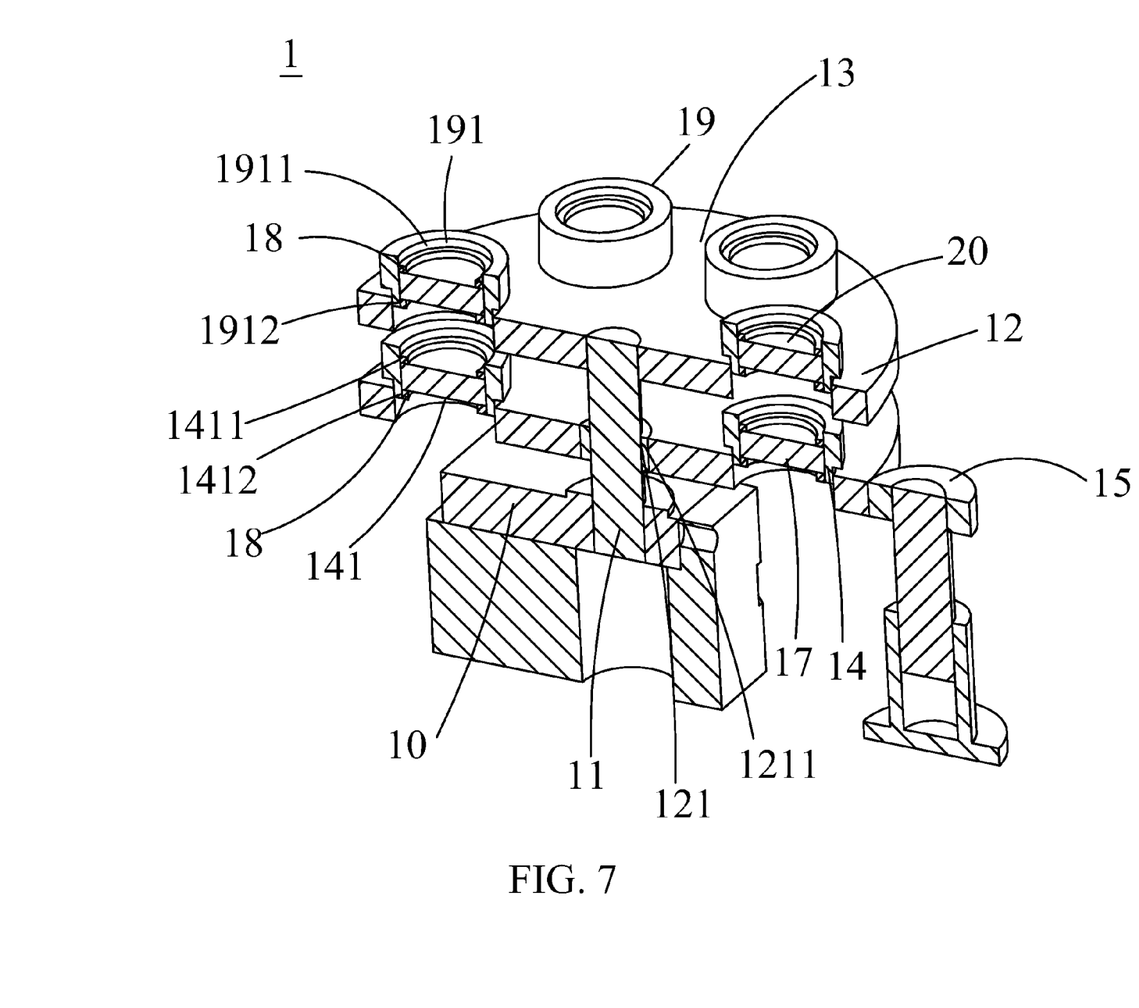
FIG. 7 is a schematic view of another state of a mechanism with a component position adjusting function of the present invention.

With reference to FIGS. 6 and 7 for two other states of a mechanism with a component position adjusting function in accordance with the present invention respectively, the mechanism with a component position adjusting function 1 comprises a drive unit 10, a drive shaft 11, a plate body 12, a drive wheel 13, at least one passive component 14, at least one fixing component 19 and a brake 15. Wherein, the drive unit 10 drives a component to perform a forward or reverse rotating shift. An end of the drive shaft 11 is fixed to the drive unit 10, and the drive unit 10 drives the drive shaft 11 to rotate. The plate body 12 has a unidirectional component 121 disposed at the center of the plate body 12, and the unidirectional component 121 has a through hole 1211, and the other side of the drive shaft 11 is passed through the through hole 1211 and exposed from the other side of the plate body 12. With the limitation of the unidirectional component 121, the drive shaft 11 synchronously drives the plate body 12 to rotate in a forward direction.

The passive component 14 is disposed on the plate body 12, and arranged in a matrix form on the plate body 12, and the through hole 1211 is used as a center, so that when the plate body 12 is rotated, the passive component 14 can be shift to the same position. The drive wheel 13 is fixed to the drive shaft 11 and exposed from an end of the plate body 12, and the drive shaft 11 synchronously drives the drive wheel 13 to rotate. The brake 15 is disposed at a position corresponding to the height of the plate body 12. With the rotation of the unidirectional component 121 and the contact of the brake 15 with the plate body 12, the plate body 12 can be remained not to rotate in a reverse direction. Preferably, the brake 15 includes a unidirectional bearing with a limit direction opposite to the unidirectional component is disposed at a fixed position, so that when the brake 15 can rotate with the rotation of the plate body 12.

In this preferred embodiment, the first containing portion 141 of the passive component 14 is a penetrating hole for containing a wave-plate 17. In an opening 1411 and another opening 1412 of the first containing portion 141, screw threads are formed respectively and secured by two threaded rings 18 to assure that the wave-plate 17 will not slide or move, but the wave-plate 17 can rotate together with the passive component 14. The second containing portion 191 of the fixing component 19 is a penetrating hole for containing a polarizer 20. In an opening 1911 and another opening 1912 of the second containing portion 191, screw threads are formed respectively and secured by two threaded rings 18 to assure that the polarizer 20 will not fall out easily.

In addition to the portion of the description of these embodiments, the other portions are the same as those described above, and thus will not be repeated here.

Wherein, the aforementioned method of connecting the components by screw threads, pins, or fastener can be changed according to the design requirements or manufacturing methods.

What is claimed is:

1. A mechanism with a component position adjusting function, comprising:
   a drive unit rotating alternatively in a first direction and a second direction being opposite to the second direction;
   a drive shaft with an end fixed to the drive unit and driven by the drive unit to rotate;
   a plate body having a unidirectional component disposed at a center of the plate body, and the unidirectional component having a through hole, and the other end of the drive shaft being passed through the through hole and exposed from a side of the plate body, and the drive shaft synchronously driving the plate body to perform a rotation in the first direction through a limitation of the unidirectional component;
   a drive wheel fixed to an end of the drive shaft exposed from the plate body, and the drive shaft synchronously driving the drive wheel to rotate;
   at least one passive component disposed on the plate body and contacted with the drive wheel, and the drive wheel synchronously driving each passive component to rotate, each of the at least one passive component having a first containing portion accommodating an optical element comprising a polarization element, a cylindrical lens, a grating, an optical lens, a filter waveplate, an optical attenuator or a diffraction element; and
   a brake disposed at a position corresponding to a height of the plate body, and the plate body remaining still through a rotation of the unidirectional component in the second direction and a contact of the brake with the plate body;
   wherein in response to that the drive unit drives the drive shaft to rotate in the first direction, the drive shaft synchronously rotates with the plate body and switches one of the at least one passive component to a predetermined position; in response to that the drive unit drives the drive shaft to rotate in the second direction, the plate body would not rotate with the drive shaft in the second direction and the drive shaft synchronously rotates with the drive wheel to rotate the at least one passive component.

2. The mechanism with a component position adjusting function as recited in claim 1, further comprising at least one rotating component disposed at a position corresponding to the at least one passive component.

3. The mechanism with a component position adjusting function as recited in claim 2, wherein the at least one passive component is disposed onto the at least one rotating component respectively, and the at least one rotating component is disposed onto the plate body.

4. The mechanism with a component position adjusting function as recited in claim 2, wherein the at least one rotating component is a bi-directional bearing or a bi-directional ratchet.

5. The mechanism with a component position adjusting function as recited in claim 1, wherein the unidirectional component is a limit unidirectional rotating component selected from a group consisting of a unidirectional bearing and a unidirectional ratchet.

6. The mechanism with a component position adjusting function as recited in claim 1, wherein the drive wheel is contacted with the at least one passive component by a contact between a gear set, a friction wheel set or a pulley set.

7. The mechanism with a component position adjusting function as recited in claim 1, wherein the first containing portion is penetrated through the passive component.

8. The mechanism with a component position adjusting function as recited in claim 1, further comprising at least one fixing component disposed on the plate body and corresponding to the passive component and on a different side of the passive component, and each fixing component having a second containing portion.

9. The mechanism with a component position adjusting function as recited in claim 8, wherein the second containing portion is penetrated through the fixing component.

10. A mechanism with a component position adjusting function, comprising:
    a drive unit rotating alternatively in a first direction and a second direction being opposite to the second direction;
    a drive shaft with an end fixed to the drive unit and driven by the drive unit to rotate;
    a plate body having a unidirectional component disposed at a center of the plate body, and the unidirectional component having a through hole, and the other end of the drive shaft being passed through the through hole and exposed from a side of the plate body, and the drive shaft synchronously driving the plate body to perform a rotation in the first direction through a limitation of the unidirectional component;
    at least one passive component disposed on the plate body, wherein each passive component has a first containing portion penetrated through the passive component and accommodating an optical element comprising a polarization element, a cylindrical lens, a grating, an optical lens, a filter waveplate, an optical attenuator or a diffraction element;
    a drive wheel fixed to the drive shaft and exposed from an end of the plate body, and the drive shaft synchronously driving the drive wheel to rotate;
    at least one fixing component disposed onto the drive wheel and corresponding to the at least one passive component; and
    a brake disposed at a position corresponding to a height of the plate body, and the plate body remaining still through a rotation of the unidirectional component in the second direction and a contact of the brake with the plate body;
    wherein in response to that the drive unit drives the drive shaft to rotate in the first direction, the drive shaft synchronously rotates with the plate body and switches one of the at least one passive component to a predetermined position; in response to that the drive unit drives the drive shaft to rotate in the second direction, the plate body would not rotate with the drive shaft in the second direction and the drive shaft synchronously rotates with the drive wheel to rotate the at least one passive component.

11. The mechanism with a component position adjusting function as recited in claim 10, wherein the unidirectional component is a unidirectional bearing or a unidirectional ratchet.

12. The mechanism with a component position adjusting function as recited in claim 10, wherein each fixing component has a second containing portion penetrated through the fixing component.

* * * * *